US009942822B2

(12) United States Patent
Kaushik

(10) Patent No.: US 9,942,822 B2
(45) Date of Patent: *Apr. 10, 2018

(54) DIRECTED STATION ROAMING IN CLOUD MANAGED WI-FI NETWORK

(71) Applicant: Fortinet, Inc., Sunnyvale, CA (US)

(72) Inventor: Anil Kaushik, Marathalli (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,431

(22) Filed: Apr. 14, 2017

(65) Prior Publication Data

US 2017/0280368 A1 Sep. 28, 2017

Related U.S. Application Data

(63) Continuation of application No. 15/366,096, filed on Dec. 1, 2016, now Pat. No. 9,635,597, which is a continuation of application No. 14/813,076, filed on Jul. 29, 2015, now Pat. No. 9,538,446.

(51) Int. Cl.
*H04W 36/38* (2009.01)
*H04W 36/08* (2009.01)
*H04W 52/40* (2009.01)
*H04W 36/30* (2009.01)
*H04L 29/08* (2006.01)
*H04B 17/318* (2015.01)
(Continued)

(52) U.S. Cl.
CPC .......... *H04W 36/38* (2013.01); *H04B 17/318* (2015.01); *H04L 67/10* (2013.01); *H04W 36/08* (2013.01); *H04W 36/30* (2013.01); *H04W 52/40* (2013.01); *H04W 84/12* (2013.01); *H04W 88/12* (2013.01)

(58) Field of Classification Search
CPC . H04W 36/0055; H04W 36/08; H04W 36/12; H04W 36/18; H04W 36/30; H04W 48/18; H04W 8/06; H04W 8/12; H04W 8/183; H04W 8/26
See application file for complete search history.

(56) References Cited

U.S. PATENT DOCUMENTS

| | | | |
|---|---|---|---|
| 8,707,396 B2 | 4/2014 | Kim et al. | |
| 8,867,342 B2 | 10/2014 | Mathur et al. | |
| 8,922,344 B2 | 12/2014 | Kaushik et al. | |

(Continued)

*Primary Examiner* — Sharad Rampuria
(74) *Attorney, Agent, or Firm* — Law Office of Dorian Cartwright; Dorian Cartwright

(57) ABSTRACT

Directing station roaming in a cloud-managed Wi-Fi network. Management messages are received from a controller that is located remotely from the Wi-Fi communication network by an access point. When an RSSI (received signal strength indication) value between the station and the access point falls below a threshold, the access point (i.e., controller access point) determines which neighboring access point would be a best fit for a hand-off, with limited real-time input form the cloud-based Wi-Fi controller. One of the two or more of the plurality of access points is selected for handing-off the station based on the RSSI values received from the interrogation. Responsive to the selection, a message is sent to the selected access point instructing the one of the at least one of the plurality of access points to respond to messages from the station.

12 Claims, 6 Drawing Sheets

(51) Int. Cl.
*H04W 88/12* (2009.01)
*H04W 84/12* (2009.01)

(56) References Cited

U.S. PATENT DOCUMENTS

| | | |
|---|---|---|
| 9,368,024 B2 | 6/2016 | Tan et al. |
| 9,510,214 B1 | 11/2016 | Balasubramaniam |
| 2008/0198811 A1 | 8/2008 | Deshpande et al. |
| 2009/0103503 A1 | 4/2009 | Chhabra |
| 2010/0085938 A1 | 4/2010 | Chen et al. |
| 2012/0046063 A1 | 2/2012 | Chande et al. |
| 2013/0089073 A1 | 4/2013 | Zhu |
| 2013/0208713 A1* | 8/2013 | Hamade ............... H04W 48/18 370/338 |
| 2013/0329700 A1 | 12/2013 | Han et al. |
| 2014/0137188 A1* | 5/2014 | Bartholomay ..... G06Q 30/0251 726/3 |
| 2014/0235170 A1* | 8/2014 | Zhang ................... H04W 76/02 455/41.2 |
| 2015/0124774 A1 | 5/2015 | Kaushik et al. |
| 2015/0237519 A1 | 8/2015 | Ghai |
| 2015/0295929 A1 | 10/2015 | Fan et al. |
| 2016/0112886 A1 | 4/2016 | Malik et al. |
| 2016/0255538 A1 | 9/2016 | Savarimuthu |
| 2016/0295485 A1* | 10/2016 | Ponnuswamy ..... H04W 36/245 |
| 2016/0309524 A1 | 10/2016 | Barreto De |
| 2016/0353288 A1 | 12/2016 | Patel |

* cited by examiner

DIRECTED STATION ROAMING IN CLOUD MANAGED WI-FI NETWORK

CROSS-REFERENCE TO RELATED APPLICATIONS

This application claims priority as a continuation of U.S. patent application Ser. No. 15/366,096 filed Dec. 1, 2016, entitled Directed Station Roaming In Cloud Managed Wi-Fi Network by Anil Kaushik, which is a continuation of U.S. patent application Ser. No. 14/813,076 filed Jul. 29, 2015, entitled Directed Station Roaming In Cloud Managed Wi-Fi Network by Anil Kaushik, the content of each being incorporated herein by reference in their entirety.

FIELD OF THE INVENTION

The invention relates generally to computer networking, and more specifically, to directing how stations roam between access points in a Wi-Fi network managed from a cloud-based controller.

BACKGROUND

Increased reliability and speeds of the Internet has fueled the growth of cloud-based services. Rather than locally storing applications or owning physical devices for certain functions, an individual or commercial enterprise can access the services on-demands from cloud-based devices and storage. In particular, mobile devices, with limited processing power and storage capacity, are making use of the cloud. These devices operate under standards such as IEEE 802.11 (promulgated by the Institute of Electrical and Electronics Engineers), IEEE 802.3, and others.

In some enterprise networks, a local controller manages several access points that are dispersed around a physical area for designated radio coverage for mobile stations. The mobile stations detect beacons periodically sent out by the access points in order to connect for Internet access. The controller maintains communication with each of the access points in order to implement network-wide policies and manage BSSIDs for access points and stations. The controller also provides services such as virtual cell and virtual port, both of which allow the network to assert controls over stations operating under IEEE 802.11 which in standard operation, allows stations to have a lot of independence. For example, without controllers, stations control which access point to connect with, and when hand-offs between stations occur. By contrast, the controller allows the network to have some control over which access point connects with a station and when hand-offs occur.

Problematically, a cloud-based controller is not currently feasible because of the volume of communication necessary to maintain tight control over a network. For example, tunneling and virtual port service conventionally require constant communication between different access points and the controller. Despite the improved speed of the Internet, the increased flight time of a cloud solution with a high volume of communications for controllers can lead to intolerable delays.

What is needed is a robust technique in a communication network for cloud-based controllers to maintain control over an enterprise network, with limited communication.

SUMMARY

These shortcomings are addressed by the present disclosure of methods, computer program products, and systems for directing station roaming in a cloud-managed Wi-Fi network.

In one embodiment, management messages are received from a controller that is located remotely from the Wi-Fi communication network by an access point. The access point is one of a plurality of access points, each managed by a controller located on an external network. A station is associated with the access point that serves as a controller access point for the station. Others of the plurality of access points serve as controller access points for other stations.

In one embodiment, when an RSSI (received signal strength indication) value between the station and the access point falls below a threshold, the access point (i.e., controller access point) determines which neighboring access point would be a best fit for a hand-off, with limited real-time input form the cloud-based Wi-Fi controller. Responsive to falling below the threshold, at least one of the plurality of access points is interrogated for RSSI values between the station and the two or more of the plurality of access points.

In still another embodiment, one of the two or more of the plurality of access points is selected for handing-off the station based on the RSSI values received from the interrogation. Responsive to the selection, a message is sent to the selected access point instructing the one of the at least one of the plurality of access points to respond to messages from the station Advantageously, controllers can be implemented remotely to save enterprises the expense and administrative complexity of an on-site controller. Furthermore, third parties can provide controller functionality as a service. Additionally, geographically-dispersed enterprises can be centrally managed by a controller.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for directing station roaming in a cloud-managed Wi-Fi network. At a high-level, a controlling access point facilitates access point hand-offs locally to reduce communications necessary with a cloud-based controller. One of ordinary skill in the art will recognize that many other scenarios are possible, as discussed in more detail below.

Systems to Direct Roaming in a Cloud Managed Wi-Fi Network (FIGS. 1-4)

Figure 1A:
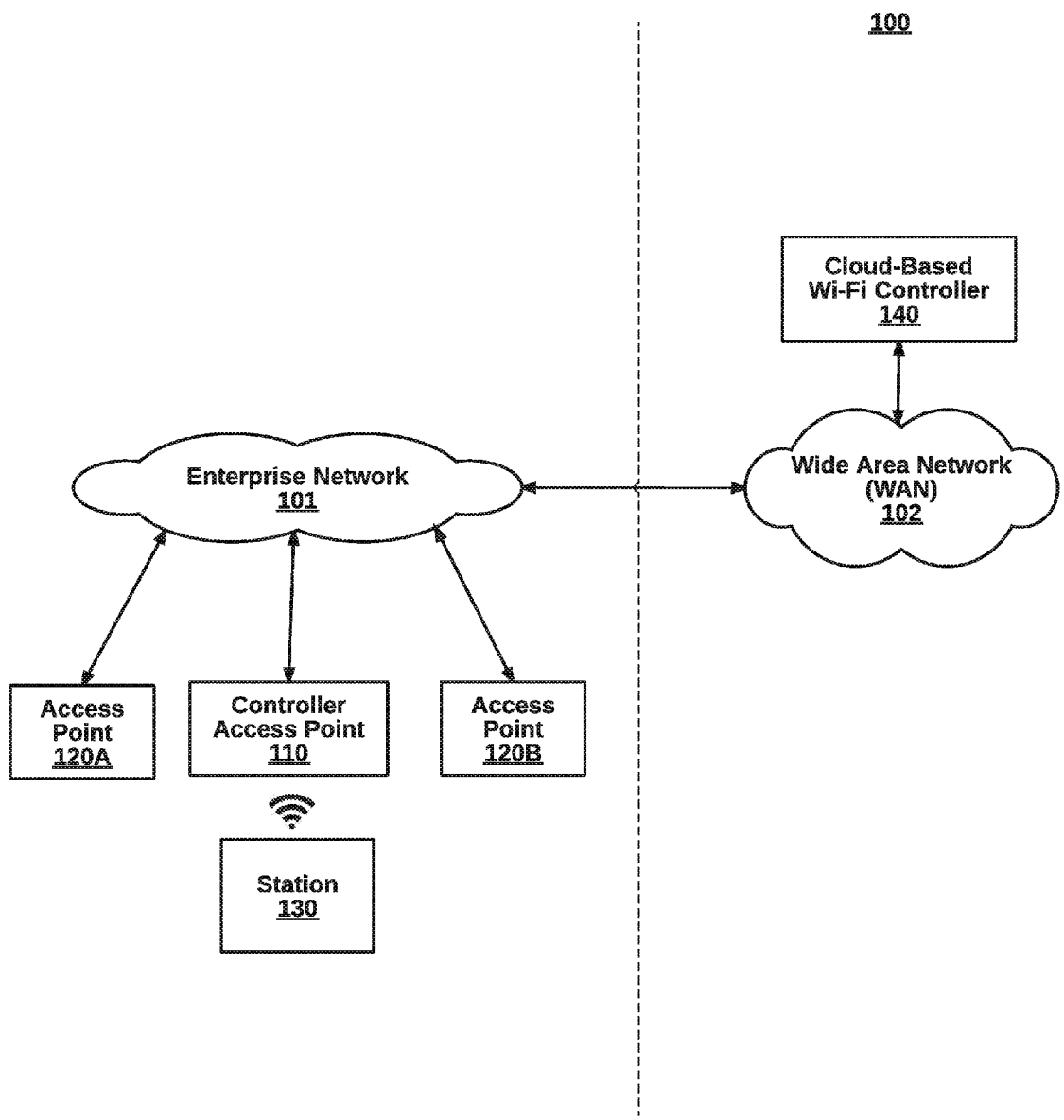
FIGS. 1A & 1B are high-level block diagram illustrating a system to direct station roaming in a cloud-managed Wi-Fi network, according to one embodiment.
Figure 1B:
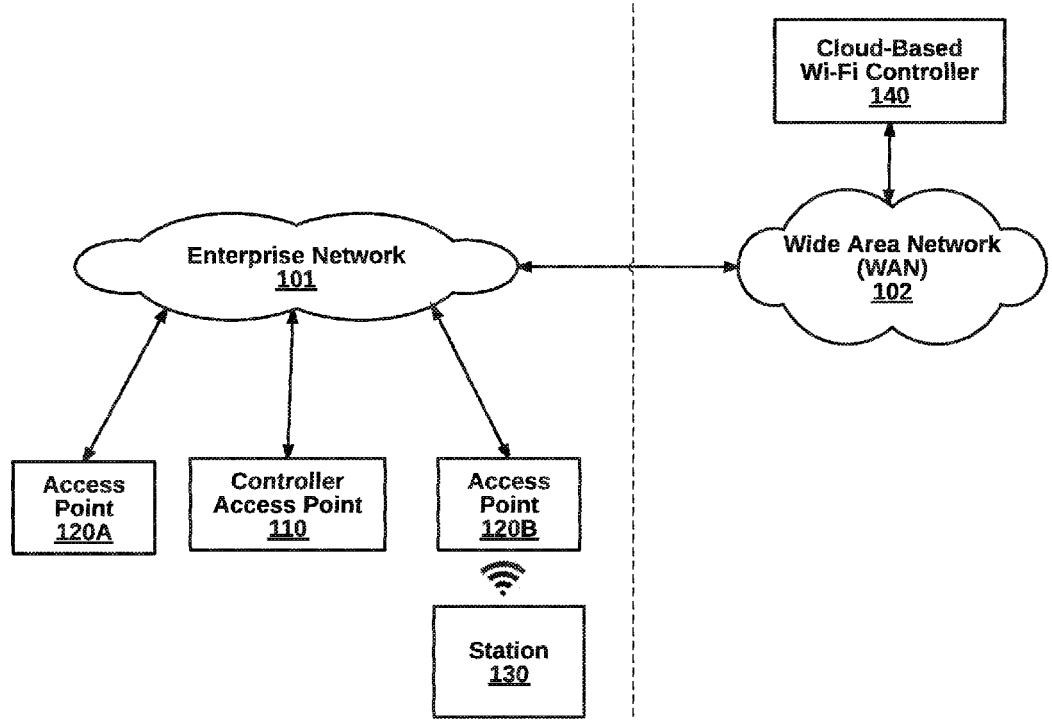

FIGS. 1A & 1B are high-level block diagram illustrating a system 100 to direct station roaming in a cloud-managed Wi-Fi network, according to one embodiment. The system 100 comprises an enterprise (local) network 101 and wide area (external) network (WAN) 102 coupled by any communication channel such as a gateway enabled connection, a switch, a router, a plurality of individual connections between local components and external component, or the like. Components coupled to the enterprise network 101 comprises a controller access point 110, access points 120A,B and station 130. A cloud-based Wi-Fi controller 140 coupled to the WAN 102. Additional network components can also be part of the system 100, such as firewalls, virus scanners, routers, switches, application servers, databases, as well as additional controllers, access points, access switches, stations, and the like. The network components can be implemented as hardware, software, or a combination of both.

Embodiments of the system 100 can be implemented in conjunction with a network security system, for example, the FortiGate Network Security platform by Fortinet of Sunnyvale, Calif. In more detail, a firewall may examine communications with the cloud-based Wi-Fi controller 140 as communications with an external resource.

The enterprise network 101 can serve, for example, a business enterprise, a hospital or system of hospital, school, building, a private network, or the like. A combination of wired and wireless devices can be connected, as well as only wireless devices or only wired devices. The WAN 102 can be, for example, the Internet, a cellular network, or even a large enterprise network to which the enterprise network 101 is a smaller component of. In a preferred embodiment, the station 130 is coupled to the controller access point 110 over a wireless channel. The cloud-based Wi-Fi controller 140 is coupled to the WAN 102. Components can be directly connected or communicatively coupled through a network, despite the example of FIG. 1. Components can use communication protocols such as IEEE 802.11, IEEE 802.3, Bluetooth, 3G and 4G.

The controller access point 110 substitutes for the cloud-based Wi-Fi controller 140 as an ad-hoc controller for a particular station by selecting a neighboring access point for the station while roaming around the enterprise network 101. As a result, real-time communication with the cloud-based Wi-Fi controller 140 can be reduced for speedier hand-offs while stations roam around the network. Previous techniques can concede all decision making to a local controller that manages services such as virtual cell and virtual port. In more detail, virtual cell makes the enterprise network 101 appear as a single BSSID so that the station 130 moves between best-serving access points without being aware of a change because a controller instructs which access points should respond to messages from the station 130. Virtual port provides additional control for the network by assigning a persistent and unique BSSID to the station 130 that is also handed-off between best-serving access points to match movements of the station 130. In a preferred embodiment, hand-offs are due to waning RSSI strengths at a current access point connection. Other factors that can fully or partially lead to hand-offs include, but are not limited to, interference, resource loads (e.g., processor, memory, queue), network congestion, load balancing, and the like. Furthermore, one embodiment implementing an SDN controller (not shown) can centralize layer 2, or data plane, decision making, and request a hand-off due to layer 2 conditions or policies.

Selection of the ad-hoc controller varies and specific policies can be promulgated by the cloud-based Wi-Fi controller 140 and periodically updated. In one embodiment, any of the access points 120A,B can also become ad-hoc controllers as controlled by network policies. One default implementation assigns the first access point to which a connection is made on the enterprise network 101 as the ad-hoc controller, an assignment that is maintained throughout a connection session. Another implementation assigns a currently connected access point as the ad-hoc controller, an assignment that dynamically changes throughout a connection session. Still another implementation assigns the ad-hoc controller for a station regardless of an actual connection to the station, for example, an access point dedicated to serving as an ad-hoc controller or an access point with the lowest current load. An additional implementation uses a random or rotational assignment.

In one embodiment, selection of the best neighboring access point varies and can be set by network policy set by the cloud-based Wi-Fi controller 140 or otherwise. For example, the controller access point 110 can request that neighboring access points 120A and 120B both measure local RSSI values to the station 130. The highest RSSI value can then be selected. Comparing FIG. 1A to 1B, the access point 120B was selected over the access point 120A. Neighboring access points can include all within range of the station 110. In other examples, more complicated selection processes occur. In one example, an acceleration of RSSI values is taken into consideration as a prediction of which direction the station 110 is moving and thus which of the neighboring access points will have the strongest RSSI values at a future point in time. In further examples, other factors mentioned above can come in to play including interference, resource loads, network congestion, load balancing, and the like.

The cloud-based Wi-Fi controller 140 provides remote management of network Wi-Fi services. Having individual communication with each of the access points 110, 120A,B, management decisions can be made with network-wide considerations rather than allowing independent access points to make decisions selfishly based only local considerations. The remote location of the cloud-based Wi-Fi controller 140 allows powerful server configurations to support small businesses that do not want to purchase a local controller or do not want the network administration responsibilities. In other words, the remote architecture allows companies such a Meru Networks or Amazon to provide controllers as a service for a monthly rate. The remote location also allows for centralized management for an enterprise with one campus in Sunnyvale, Calif. and a second campus in Bangalore, India.

Using the current techniques, the cloud-based Wi-Fi controller 140 off-loads at least some real-time decision making that can be slowed up by network flight times. The level of off-loading varies in different implementations. The off-loading can be given to one access point or distributed among many. One mode, such as a safety mode, can be implemented to temporarily halt off-loading and forward all real-time decisions to the cloud-based Wi-Fi controller 140. All packets can also be tunneled, or forwarded, to the cloud-based Wi-Fi controller 140 for handling. This may be necessary to resolve conflicts between different ad-hoc controllers, to triage network errors, or otherwise. Distribution of rules, policies and updates of network conditions can be sent from the cloud-based Wi-Fi controller to enable off-loading. In one embodiment, distributions are sent to an SDN controller for layer 2implementation of off-loading with OpenFlow rules (e.g., layer 2steering of stations, or priority treatment of packets from certain stations).

The cloud-based Wi-Fi controller 140 can be implemented in any of the computing devices discussed herein (e.g., see FIG. 9). For example, the cloud-based Wi-Fi controller 140 can be an MC1500 or MC6000 device (e.g., modified) by Meru Networks of Sunnyvale, Calif. More embodiments of the cloud-based Wi-Fi controller 140 are discussed with respect to FIG. 3.

The access points 120A, B can be the same as controller access point 110, in some embodiments. Because the controller access point 110 can be relative to a particular station, each of the access points 120A, B can operate as ad-hoc controllers and the controller access point 110 can operate as a conventional access point. In other embodiments one or more of the access points 120A, B does not ever operate as an ad-hoc controller.

To provide network service to the station 130, in one embodiment, the access points 120A, B comply with IEEE 802.11 protocols (promulgated by the Institute of Electrical and Electronics Engineers) to provide Wi-Fi service to the station 130 over wireless communication channels. Under IEEE 802.11, a beacon with one or more BSSIDs is periodically sent to advertise a presence for new connections and maintain current connections. Then access points listen for packets addressed to associated BSSIDs and ignore packets addressed to unassociated BSSIDs. Furthermore, the access point 130 forward packets addressed to MAC (Media Access Control) addresses of associated stations.

The access points 120A, B include one or more individual access points implemented in any of the computing devices discussed herein (e.g., see FIG. 9). For example, the access point 130 can be an AP 110 or AP 433 (modified as discussed herein) by Meru Networks of Sunnyvale, Calif. A network administrator can strategically place the access point 130 for optimal coverage area over a locale. The access point 130 can, in turn, be connected to a wired hub, switch or router connected to the enterprise network 199 (or an external network). In embodiment, access point functionality is incorporated into a switch or router.

The station 130 can be, for example, a personal computer, a laptop computer, a tablet computer, a smart phone, a mobile computing device, a server, a cloud-based device, a virtual device, an Internet appliance, or any of the computing devices described herein (see e.g., FIG. 9). No special client is needed for this particular technique, although other aspects of the network may require downloads to the station 130. The station 130 access to, for example, a LAN (local area network) or external networks using an RF (radio frequency) antenna and network software complying with IEEE 802.11. Details about the station 130 are set forth in FIG. 4.

Figure 2:
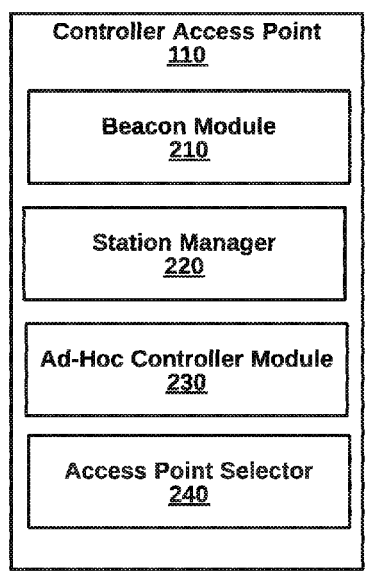
FIG. 2 is a more detailed block diagram illustrating a controller access point of the system of FIGS. 1A & 1B, according to one embodiment.

FIG. 2 is a more detailed block diagram illustrating a controller access point 110 of the system of FIGS. 1A & 1B, according to one embodiment. The controller access point 110 comprises a beacon generation module 210, station manager 220, an ad-hoc controller module 230, and an access point selector 240. The components can be implemented in hardware, software, or a combination of both.

The beacon generation module 210 generates beacons with embedded BSSIDs and parameters, according to IEEE 802.11 protocols. The station manager 220 stores globally and/or locally-influenced parameter values, policy-based parameter values, manually configured parameter values, or the like, for stations and/or BSSIDs. The ad-hoc controller module 230 communicates with the cloud-based Wi-Fi controller 140 for direction on BSSIDs, stations, to receive network-wide data, policies, and input on access point selection for hand-offs. The access point selector 240 interrogates neighboring access points and can apply factors such as network policy to determine a best fit for hand-offs of particular stations.

Figure 3:
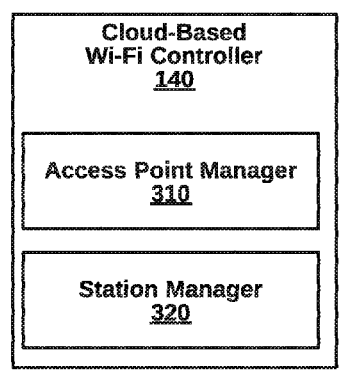
FIG. 3 is a more detailed block diagram illustrating a cloud-based Wi-Fi controller of the system of FIGS. 1A & 1B, according to one embodiment.

FIG. 3 is a more detailed block diagram illustrating a cloud-based Wi-Fi controller 140 which comprises an access point manager 310 and a station manager 320. The components can be implemented in hardware, software, or a combination of both. The access point manager 310 communicates with a group of access points for Wi-Fi functionality such as assigning BSSIDs and transferring stations between access points. The station manager 320 tracks specific stations and assigned parameters along with movement around the network. Virtual cell and/or virtual port services can be associated with specific stations.

Figure 4:
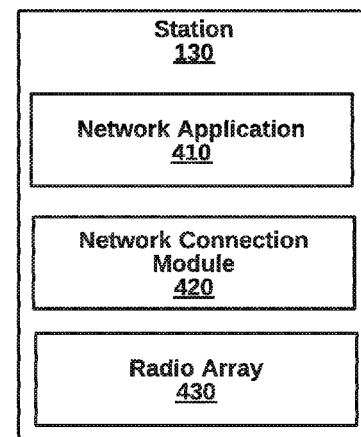
FIG. 4 is a more detailed block diagram illustrating a station of the system of FIGS. 1A & 1B, according to one embodiment.

FIG. 4 is a more detailed block diagram illustrating a station 130 of the system 100 of FIGS. 1A & 1B, according to one embodiment. The station 130 includes a network application 410 such as a browser, VOIP application or other network-based application that may be used by an operator. A network connection module 420 establishes and maintains network connectivity with access points. A radio array 430 can comprise an IEEE 802.11 radio, a Bluetooth radio, a 4G radio or the like, for wireless channel access.

Figure 5:
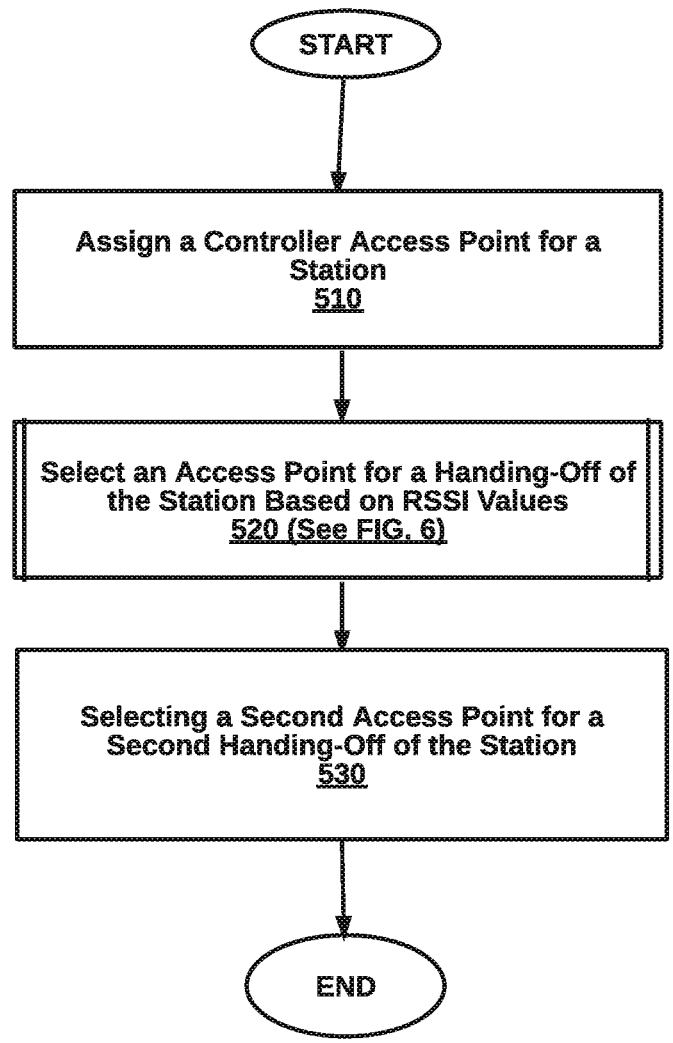
FIG. 5 is a block diagram illustrating a method for directing station roaming in a cloud-managed Wi-Fi network, according to one embodiment.
Figure 6:
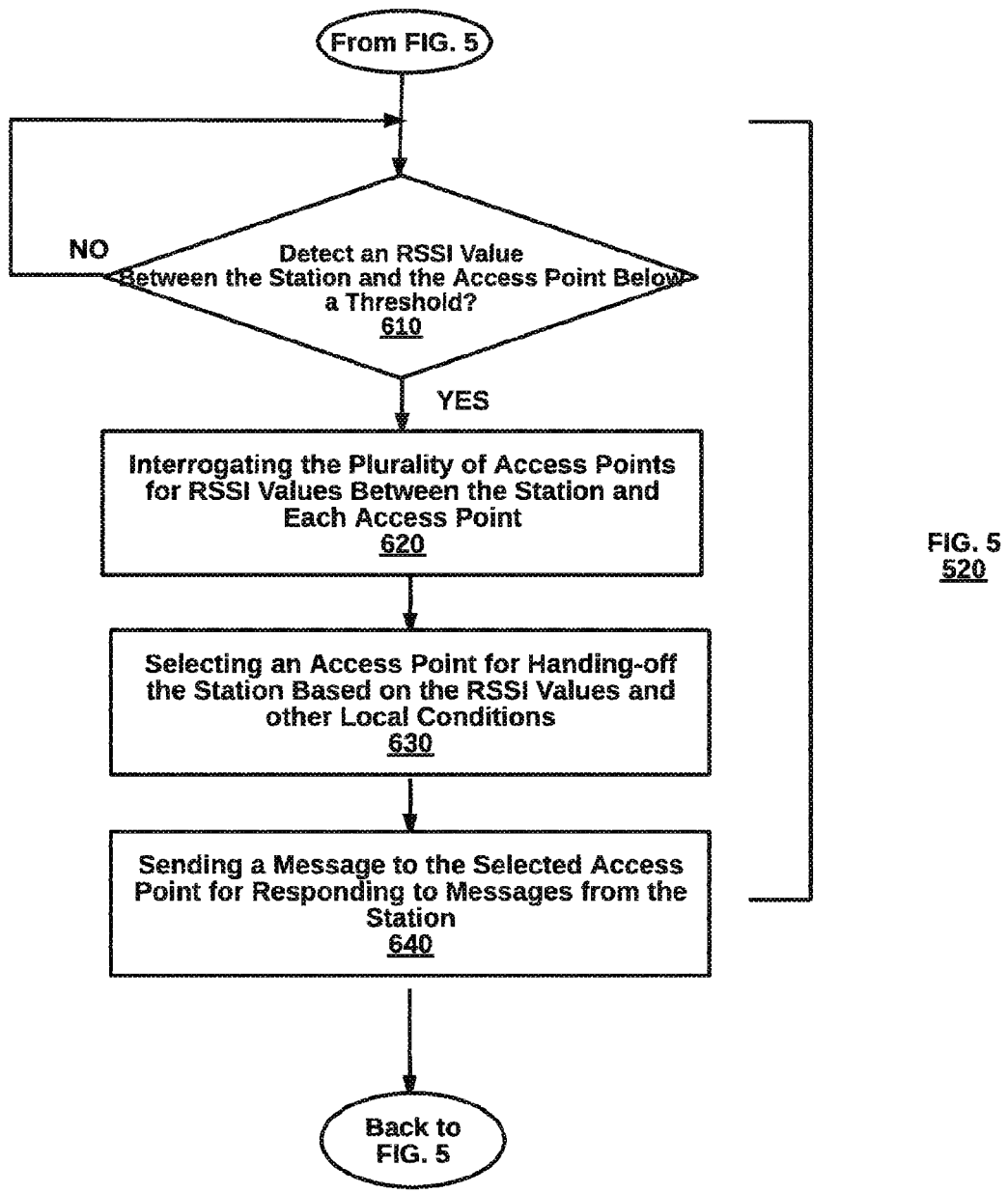
FIG. 6 is a more detailed block diagram illustrating the step for selecting an access point for handing-off a station, from the method of FIG. 5, according to one embodiment.

Methods for Directing Roaming in a Cloud Managed Wi-Fi Network (FIG. 5-6)

FIG. 5 is a block diagram illustrating a method 500 for directing station roaming in a cloud-managed Wi-Fi network, according to one embodiment. One of ordinary skill in the art will recognize that the method 600 is non-limiting as other embodiments can have more or less steps and can be performed in a different order. The method 500 can be implemented in the system 100 of FIG. 1 or in other components.

A controller access point is assigned to a station (step 510). An access point is selected from multiple access points for handling-off the station based on RSSI values (step 520), as detailed below in association with FIG. 7. A second access point is selected for handing-of the station (step 530).

FIG. 6 is a more detailed block diagram illustrating the step 520 for selecting an access point for handing-off a station, from the method of FIG. 5, according to one embodiment.

When an RSSI value between the station and the access point is detected below a threshold (step 610), a plurality of access points is interrogated for RSSI values between the station and each of the plurality of access points (step 620). An access point is selected for handing-off the station based on the RSSI values and, optionally, other local conditions (step 630). A message is sent to the selected access point for responding to messages from the station (step 640).

Figure 7:
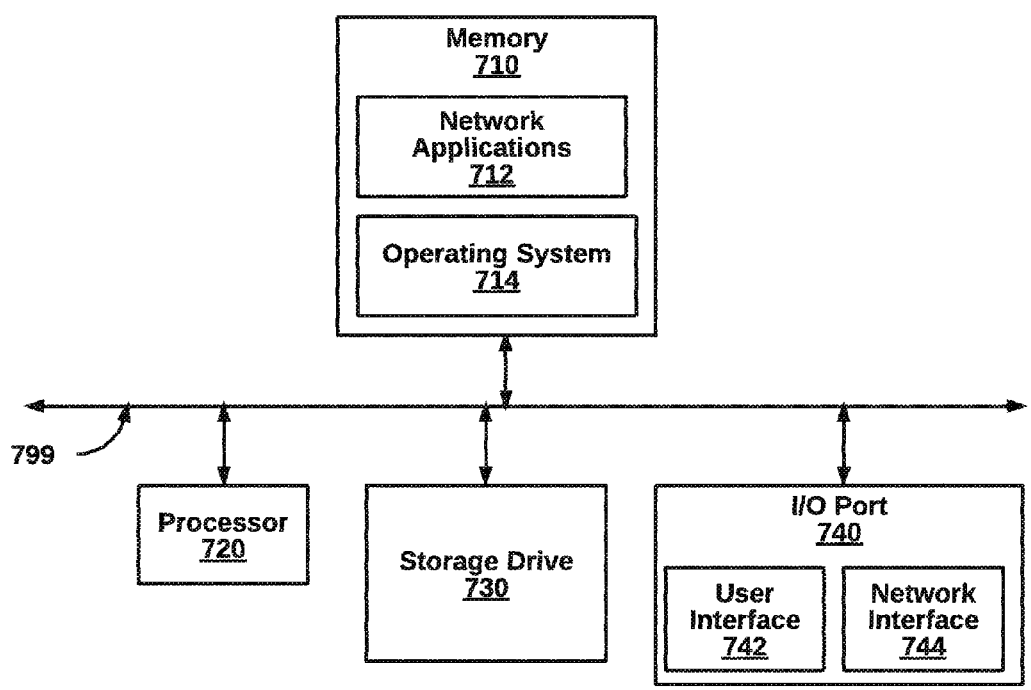
FIG. 7 is a block diagram illustrating an exemplary computing device, according to one embodiment.

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the controller access point 110, the access points 120A, B, the cloud-based Wi-Fi controller 140, and the station 130. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of the SDN controller access point 110, the access points 120A, B, the cloud-based Wi-Fi controller 140, or the station 130, as illustrated in FIGS. 1-4. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 75, 78, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730

The storage drive 730 can be any non-volatile type of storage such as a magnetic disc, EEPROM, Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in an access point for directing station roaming in a cloud-managed Wi-Fi communication network, the method comprising the steps of:

receiving management messages from a cloud-based controller that is located remotely from the Wi-Fi communication network, wherein the access point is one of a plurality of access points each managed by the cloud-based controller;

associating a station with the access point that serves as a controller access point for the station, wherein others of the plurality of access points serve as controller access points for other stations;

detecting that an RSSI (received signal strength indication) value between the station and the access point falls below a threshold;

responsive to falling below the threshold, interrogating at least one of the plurality of access points for RSSI values between the station and the two or more of the plurality of access points;

selecting one of the two or more of the plurality of access points for handing-off the station based on the RSSI values received from the interrogation;

responsive to the selection, sending a message to the selected access point, the message instructing the one of the at least one of the plurality of access points to respond to messages from the station; and receiving a management message from the cloud based controller updating the controller access point for the station to a different access point from the plurality of access points.

2. The method of claim 1, further comprising:
reducing power to the station to compel the station to initiate a hand-off.

3. The method of claim 1, further comprising:
receiving RSSI values responsive to the interrogation.

4. The method of claim 1, further comprising:
receiving RSSI values along with other local conditions responsive to the interrogation; and
selecting one of the two or more of the plurality of access points is based on a weighted combination of the RSSI values and other local conditions received from the interrogation.

5. The method of claim 1, wherein access points within the plurality of access points not selected to for hand-off of the stations ignore messages from the station.

6. The method of claim 1, wherein the access point and the selected access point use the same BSSID (basic service set identifier) for messages with the station, and wherein the hand-off from the access point to the selected access point is substantially transparent to the station.

7. The method of claim 1, further comprising:
switching to a safety mode in which selection of access points for station roaming is returned to the cloud-based Wi-Fi controller.

8. The method of claim 1, wherein the updated controller access point is the selected access point.

9. The method of claim 1, wherein the updated controller access point is one of the plurality of access points other than the selected access point.

10. The method of claim 1, wherein the updated controller access point is selected from the plurality of access points with the lowest current load.

11. A non-transitory computer-readable medium storing source code that, when executed by a processor, performs a method in an access point for directing station roaming in a cloud-managed Wi-Fi communication network, the method comprising the steps of:
receiving management messages from a cloud-based controller that is located remotely from the Wi-Fi communication network, wherein the access point is one of a plurality of access points each managed by the cloud-based controller;
associating a station with the access point that serves as a controller access point for the station, wherein others of the plurality of access points serve as controller access points for other stations;
detecting that an RSSI (received signal strength indication) value between the station and the access point falls below a threshold;
responsive to falling below the threshold, interrogating at least one of the plurality of access points for RSSI values between the station and the two or more of the plurality of access points;
selecting one of the two or more of the plurality of access points for handing-off the station based on the RSSI values received from the interrogation;
responsive to the selection, sending a message to the selected access point, the message instructing the one of the at least one of the plurality of access points to respond to messages from the station; and
receiving a management message from the cloud based controller updating the controller access point for the station to a different access point from the plurality of access points.

12. An access point for directing station roaming in a cloud-managed Wi-Fi communication network, the access point comprising:
a processor; and
a memory, storing:
a first module to receive management messages from a cloud-based controller that is located remotely from the Wi-Fi communication network wherein the access point is one of a plurality of access points each managed by the cloud-based controller;
a second module to associate a station with the access point that serves as a controller access point for the station, wherein others of the plurality of access points serve as controller access points for other stations;
a third module to detect that an RSSI (received signal strength indication) value between the station and the access point falls below a threshold;
a fourth module to, responsive to falling below the threshold, interrogate at least one of the plurality of access points for RSSI values between the station and the two or more of the plurality of access points;
a fifth module to select one of the two or more of the plurality of access points for handing-off the station based on the RSSI values received from the interrogation;
a sixth module to, responsive to the selection, send a message to the selected access point, the message instructing the one of the at least one of the plurality of access points to respond to messages from the station; and
a seventh module to receive a management message from the cloud based controller updating the controller access point for the station to a different access point from the plurality of access points.

* * * * *